US012696365B2

(12) United States Patent
Chitta

(10) Patent No.: US 12,696,365 B2
(45) Date of Patent: Jul. 28, 2026

(54) LOAD CONTROL DEVICE FOR A LIGHT-EMITTING DIODE LIGHT SOURCE

(71) Applicant: Lutron Technology Company LLC, Coopersburg, PA (US)

(72) Inventor: Venkatesh Chitta, Center Valley, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/778,105

(22) Filed: Jul. 19, 2024

(65) Prior Publication Data

US 2025/0031288 A1 Jan. 23, 2025

Related U.S. Application Data

(60) Provisional application No. 63/528,290, filed on Jul. 21, 2023.

(51) Int. Cl.
*H05B 45/20* (2020.01)
*H05B 45/10* (2020.01)

(52) U.S. Cl.
CPC ............. *H05B 45/20* (2020.01); *H05B 45/10* (2020.01)

(58) Field of Classification Search
CPC ......... H05B 45/20; H05B 45/10; H05B 45/14
See application file for complete search history.

(56) References Cited

U.S. PATENT DOCUMENTS

| | | | |
|---|---|---|---|
| 6,166,496 | A | 12/2000 | Lys et al. |
| 8,339,064 | B2 | 12/2012 | Ku et al. |
| 8,456,109 | B1 | 6/2013 | Wray |
| 8,492,987 | B2 | 7/2013 | Nuhfer et al. |
| 8,742,695 | B2 | 6/2014 | Wray |
| 9,253,849 | B2 | 2/2016 | Ter Weeme et al. |
| 9,295,126 | B2 | 3/2016 | Harbers |
| 9,538,604 | B2 | 1/2017 | Yadav et al. |
| 9,756,696 | B1 | 9/2017 | Bradford |
| 9,888,543 | B2 | 2/2018 | Chitta et al. |
| 10,299,321 | B1 | 5/2019 | Trask et al. |
| 10,420,185 | B2 | 9/2019 | Biery et al. |
| 10,935,228 | B2 | 3/2021 | Bocock et al. |
| 10,973,093 | B2 | 4/2021 | Picard et al. |
| 11,612,029 | B2 | 3/2023 | Harte et al. |
| 11,743,985 | B2 | 8/2023 | Green et al. |

(Continued)

*Primary Examiner* — Minh Tran

(74) *Attorney, Agent, or Firm* — Philip N. Smith; Glen R. Farbanish; Michael S. Czarnecki

(57) ABSTRACT

A load control device for controlling a light source may be configured to control a target color temperature near a low-end intensity level to converge the color temperature towards one or more color temperatures. The light source may include first and second emitter circuits that emit light having first and second color temperatures, respectively. The load control device may control the first and second emitter circuits to cause a present color temperature of the cumulative light emitted by the light source to be controlled towards the target color temperature. When a target intensity level is less than a threshold intensity level, the control circuit may limit the target color temperature according to at least one limit curve that causes the target color temperature to converge towards at least one of the first or second color temperatures as the target intensity level decreases towards the low-end intensity level.

20 Claims, 6 Drawing Sheets

(56) References Cited

U.S. PATENT DOCUMENTS

| | | | | |
|---|---|---|---|---|
| 2016/0183344 | A1* | 6/2016 | Chitta | G05B 19/102 700/86 |
| 2021/0307139 | A1 | 9/2021 | Green et al. | |
| 2022/0086978 | A1* | 3/2022 | Archer | H05B 45/382 |
| 2023/0209673 | A1 | 6/2023 | Harte et al. | |

* cited by examiner

LOAD CONTROL DEVICE FOR A LIGHT-EMITTING DIODE LIGHT SOURCE

CROSS-REFERENCE TO RELATED APPLICATIONS

This application claims priority to U.S. Provisional Patent Application No. 63/528,290, filed on Jul. 21, 2023, the entire disclosure of which is incorporated by reference herein.

BACKGROUND

A user environment, such as a residence or an office building for example, may be configured using various types of load control systems. A lighting control system may be used to control the lighting loads in the user environment. Each load control system may include various control devices, including input devices and load control devices. The load control devices may receive digital messages, which may include load control instructions, for controlling an electrical load from one or more of the load control devices. The load control devices may be capable of directly controlling an electrical load. The input devices may be capable of indirectly controlling the electrical load via the load control device. Examples of load control devices may include lighting control devices (e.g., a dimmer, a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, temperature sensors, and/or the like.

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

SUMMARY

As described herein, a load control device for controlling an amount of power delivered to a light source may be configured to control a target color temperature for the light source to converge the color temperature towards one or more color temperatures near a low-end intensity level. The light source may include a plurality of emitter circuits, each configured to emit light at a respective color temperature (e.g., a first emitter circuit configured to emit light having a first color temperature and a second emitter circuit configured to emit light having a second color temperature). The load control device may comprise a plurality of drive circuits, each configured to control a respective intensity level of each of the plurality of emitter circuits of the light source (e.g., a first drive circuit configured to control a first intensity level of the first emitter circuit and a second drive circuit configured to control a second intensity level of the second emitter circuit). The load control device may further comprise a control circuit configured to control the drive circuits to cause a present intensity level and a present color temperature of a cumulative light emitted by the light source to be controlled towards a target intensity level and a target color temperature, respectively. When the target intensity level is less than a threshold intensity level, the control circuit is configured to limit the target color temperature according to at least one limit curve that causes the target color temperature to converge towards at least one of a first color temperature or a second color temperature as the target intensity level decreases towards a low-end intensity level.

In addition, a method for controlling an amount of power delivered to a light source having a first emitter circuit configured to emit light having a first color temperature and a second emitter circuit configured to emit light having a second color temperature is disclosed herein. The method may comprise: (1) controlling a first drive circuit to control a first intensity level of the first emitter circuit; (2) controlling a second drive circuit to control a second intensity level of the second emitter circuit; (3) controlling the first and second drive circuits to cause a present intensity level and a present color temperature of a cumulative light emitted by the light source to be controlled towards a target intensity level and a target color temperature, respectively; and (4) when the target intensity level is less than a threshold intensity level, limiting the target color temperature according to at least one limit curve that causes the target color temperature to converge towards at least one of a first color temperature or a second color temperature as the target intensity level decreases towards a low-end intensity level.

DETAILED DESCRIPTION

Figure 1:
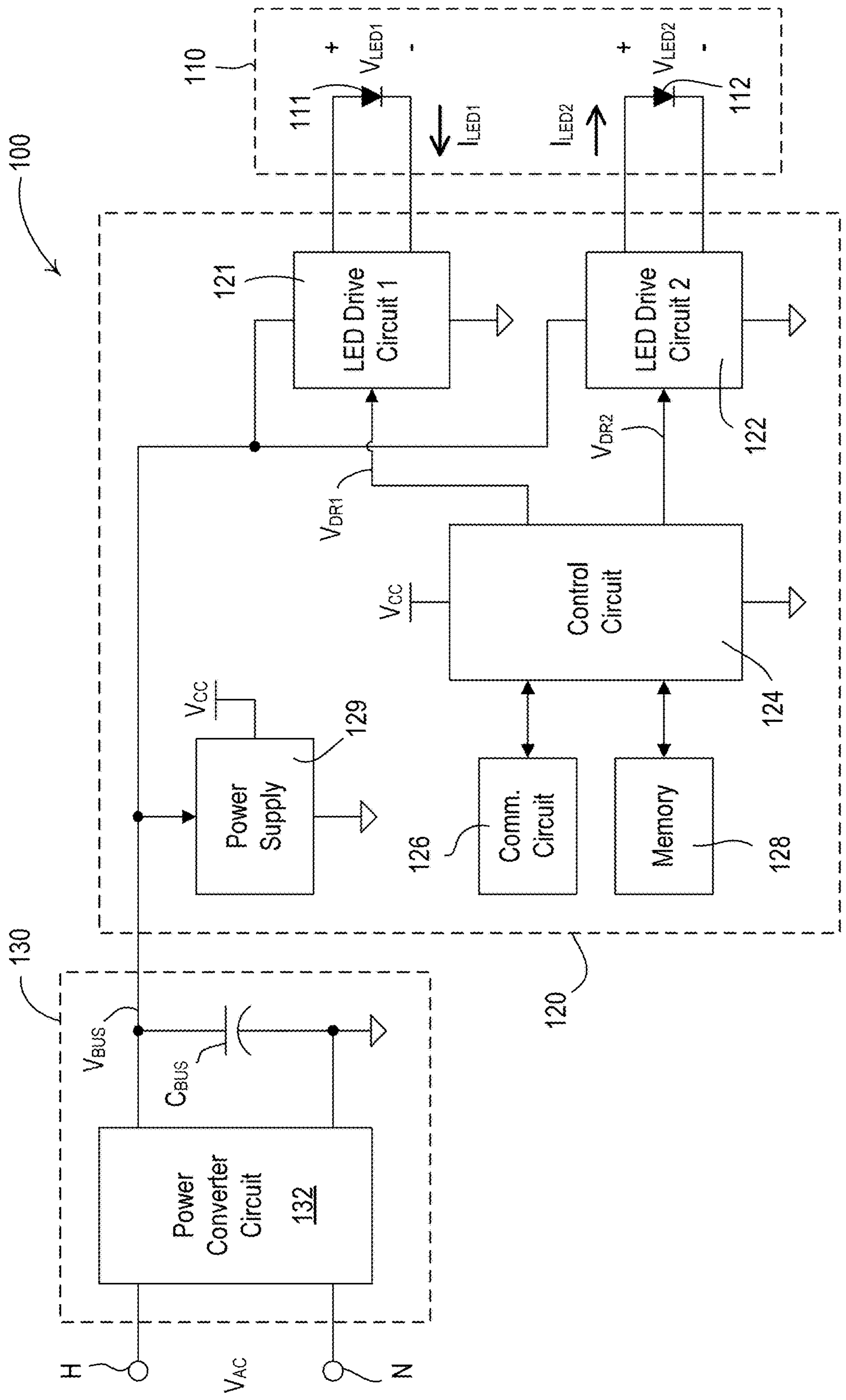
FIG. 1 is a simplified block diagram of an example load control system, such as a light-emitting diode driver system.

FIG. 1 is a simplified block diagram of an example load control system, such as a light-emitting diode (LED) driver system 100. The LED driver system 100 may comprise a load control device, such as a driver module 120 (e.g., a dimming module), for controlling a light source 110. The LED driver system 100 may also comprise a power converter module 130 for powering the light source 110 and/or the driver module 120. For example, the light source 110 of the LED driver system 100 may comprise a plurality of emitter circuits, such as emitter circuits 111, 112 (e.g., LED circuits). Each of the emitter circuits 111, 112 may include one or more emitters. The emitters of each emitter circuit 111, 112 may be electrically coupled together in series and/or parallel connection. As such, the emitters of each emitter circuit 111, 112 may be controlled in unison. The driver module 120 may control the emitter circuits 111, 112 to adjust an intensity level (e.g., lighting intensity level and/or brightness) and/or a color (e.g., a color temperature)

of a cumulative light emitted by the light source 110. In some examples, the light source 110, the driver module 120, and the power converter module 130 may be separate devices (e.g., housed in separate enclosures and/or fixtures). Further, the light source 110, the driver module 120, and the power converter module 130 may be housed in a single enclosure, or some combination thereof (e.g., when the LED driver system 100 is a controllable light source). While FIG. 1 shows the light source 110 having the emitter circuits 111, 112, the light source 110 may also comprise more than two emitter circuits.

Each of the emitter circuits 111, 112 is shown in FIG. 1 as a single LED, but, as noted above, may each comprise a plurality of LEDs connected in series (e.g., a string or chain of LEDs), a plurality of LEDs connected in parallel, or a suitable combination thereof, depending on the particular lighting system. The emitter circuits 111, 112 may each represent a string of one or more LEDs, where the LEDs in each string are all configured to emit light at the same color temperature. The strings of LEDs represented by each of the emitter circuits 111, 112 may be configured to emit light at different color temperatures. Further, the emitter circuits of the light source 110 are not limited to LEDs, and in some examples, other technology, such as OLEDs may be used. For example, the light source 110 may comprise tape lighting (e.g., strip lighting) where each of emitter circuits 111, 112 is a separate string of LEDs, each string being of a respective, and different, color temperature for example. When the light source 110 is tape lighting, each tape of lighting may be mounted on the same piece of tape, mounted on different pieces of tape, housed separately, housed together in one housing, or some combination thereof.

Each of the emitter circuits 111, 112 may be configured to emit light at a color temperature (e.g., a different color temperature) that is along a black body locus. For example, the first emitter circuit 111 may represent a string of LEDs at a first color temperature $T_1$, and the second emitter circuit 112 may represent a string of LEDs at a second color temperature $T_2$. The first color temperature may be greater than the second color temperature. For example, the first color temperature may be a cool-white color temperature (e.g., such as approximately 3000 K) and the second color temperature may be a warm-white color temperature (e.g., such as approximately 1800 K). Although described in context of these color temperatures, the emitter circuits 111, 112 may be configured to emit light accordingly to any color temperature. Although described as comprising two emitter circuits, the LED driver system 100 may be include more or less than two emitter circuits that are each configured to emit light at different color temperatures (e.g., and that configured with the same or a different number of LEDs). In addition, the LED driver system 100 may include more than the two emitter circuits 111, 112, where several of the emitter circuits are at a first color temperature and one or more of the remaining emitter circuits are at a second different color temperature, for example. Further, as noted herein, each LED of each of the emitter circuits 111, 112 may be configured to emit light at nominal or rated color temperature, for example, as defined by ANSI C78.377-2011.

The power converter module 130 may include a power converter circuit 132, which may receive a source voltage, such as an AC mains line voltage $V_{AC}$, via a hot connection H and a neutral connection N. The power converter circuit 132 may generate a DC bus voltage $V_{BUS}$ (e.g., approximately 15-50V) across a bus capacitor $C_{BUS}$. The power converter circuit 132 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 132 may provide electrical isolation between the AC power source and the driver module 120 and/or the emitter circuits 111, 112. The power converter circuit 132 may also operate as a power factor correction (PFC) circuit to adjust the power factor of the LED driver system 100 towards a power factor of one. Although illustrated as connected to an AC power source (e.g., the AC mains line voltage $V_{AC}$), in other examples the LED driver system 100 may be coupled to a direct current (DC) power source. Here, the power converter module 130 may not be needed or may convert a DC source voltage of the DC power source to the DC bus voltage $V_{BUS}$ (e.g., at a desired magnitude between approximately 15-50V).

The driver module 120 may comprise a plurality of drive circuits, such as LED drive circuits 121, 122 for controlling (e.g., individually controlling) an amount of power delivered to and an individual intensity level $L_{IND1}$, $L_{IND2}$ (e.g., lighting intensity level and/or luminous flux) of the light emitted by each of the respective emitter circuits 111, 112 of the light source 110. Both of the LED drive circuits 121, 122 may receive the bus voltage $V_{BUS}$ (e.g., which may be generated by the power converter circuit 132). Each of the LED drive circuits 121, 122 may be configured to adjust (e.g., independently adjust), for example, a magnitude (e.g., an average magnitude) of a respective LED voltage $V_{LED1}$, $V_{LED2}$ produced across the respective emitter circuit 111, 112. For example, each of the LED drive circuits 121, 122 may be configured to pulse-width modulate the respective LED voltage $V_{LED1}$, $V_{LED2}$ for adjusting the individual intensity level $L_{IND1}$, $L_{IND2}$ of the light emitted by the respective emitter circuit 111, 112. In some examples, each of the LED drive circuits 121, 124 may receive the bus voltage $V_{BUS}$ and may adjust magnitudes (e.g., average magnitudes) of respective LED currents $I_{LED1}$, $I_{LED2}$ conducted through the emitter circuits 111, 112. Each of the LED drive circuits 121, 122 may comprise a regulation circuit, such as a switching regulator (e.g., a buck converter) for controlling the magnitudes of the respective LED voltages $V_{LED1}$, $V_{LED2}$ and/or the respective LED currents $I_{LED1}$, $I_{LED2}$. While FIG. 1 shows the driver module 120 having the LED drive circuits 111, 112, the driver module 120 may also comprise more than two LED drive circuits. In some examples, the driver module 120 may comprise a plurality of LED drive circuits where each of the plurality of LED drive circuits is configured to control an individual intensity level of one of the plurality of emitter circuits of the light source 110.

The driver module 120 may comprise a control circuit 124 for controlling the LED drive circuits 121, 122 to control the individual intensity level $L_{IND1}$, $L_{IND2}$ of each of the emitter circuits 111, 112 of the light source 110. The control circuit 124 may comprise one or more of, for example, a microprocessor, a microcontroller, a programmable logic device (PLD), an application specific integrated circuit (ASIC), a field-programmable gate array (FPGA), or any other suitable processing device or controller. The control circuit 124 may be configured to control the LED drive circuits 121, 122 to control a present intensity level $L_{PRES}$ (e.g., a present brightness) and/or a present color temperature $T_{PRES}$ of a cumulative light emitted by the light source 110. For example, the control circuit 124 may be configured to control the present intensity level $L_{PRES}$ of the cumulative light emitted by the light source 110 between a high-end intensity level $L_{HE}$ (e.g., a maximum intensity level, such as approximately 100%) and a low-end intensity level $L_{LE}$ (e.g., a minimum intensity level, such as approximately 0.1%-1.0%)). The control circuit 124 may be configured to generate one or more drive signals $V_{DR1}$, $V_{DR2}$ for controlling the respective LED drive circuits 121, 122. The control circuit 124 may be configured to generate each of the one or more drive signals $V_{DR1}$, $V_{DR2}$ at an operating frequency fop (e.g., approximately 2.05 kHz), such that each of the one or more drive signals $V_{DR1}$, $V_{DR2}$ are characterized by an operating period $T_{OP}$ (e.g., approximately 488 μsec). For example, the control circuit 124 may be configured to adjust an on-time $T_{ON1}$ of the first drive signal $V_{DR1}$ to adjust the individual intensity level $L_{IND1}$ of the first emitter circuit 111, and adjust an on-time $T_{ON2}$ of the second drive signal $V_{DR2}$ to adjust the individual intensity level $L_{IND2}$ of the second emitter circuit 112 (e.g., while maintaining the operating frequency fop and/or the operating period $T_{OP}$ at constant values). The control circuit 124 may be configured to adjust (e.g., independently adjust) the on-time $T_{ON1}$ of the first drive signal $V_{DR1}$ and the on-time $T_{ON2}$ of the second drive signal $V_{DR2}$ to adjust the present intensity level $L_{PRES}$ and/or the present color temperature $T_{PRES}$ of the cumulative light emitted by the light source 110.

The control circuit 124 may be characterized by a minimum step size $\Delta_{T-ON}$ (e.g., approximately 26 nsec) in the adjustment of the on-time $T_{ON1}$ of the first drive signal $V_{DR1}$ and the on-time $T_{ON2}$ of the second drive signal $V_{DR1}$, which may also establish a minimum on-time $T_{ON-MIN}$ to which the control circuit 124 may adjust the on-time $T_{ON1}$ of the first drive signal $V_{DR1}$ and the on-time $T_{ON2}$ of the second drive signal $V_{DR2}$. The control circuit 124 may be configured to adjust the target intensity level $L_{TRGT}$ of the light source 110 to a number NL (e.g., approximately 2000) of discrete intensity levels that are spaced apart (e.g., equally spaced apart) between the high-end intensity level $L_{HE}$ and the low-end intensity level $L_{LE}$, which may result in an intensity level step size $\Delta_L$ of approximately 0.05%.

The control circuit 124 may be configured to adjust the present color temperature $T_{PRES}$ of the cumulative light emitted by the light source 110 by adjusting duty cycles $d_1$, $d_2$ of the respective drive signals $V_{DR1}$, $V_{DR2}$ during a cumulative on-time $T_{ON-C}$ of both of the emitter circuits 111, 112. For example, the cumulative on-time $T_{ON-C}$ may be the sum of the on-time $T_{ON1}$ of the first drive signal $V_{DR1}$ and the on-time $T_{ON2}$ of the second drive signal $V_{DR2}$, such that the duty cycles $d_1$, $d_2$ add up to 100%. The control circuit 124 may be configured to determine the duty cycles $d_1$, $d_2$ of the respective drive signals $V_{DR1}$, $V_{DR2}$ for controlling the present color temperature $T_{PRES}$ of the cumulative light emitted by the light source 110 to the target color temperature $T_{TRGT}$. For example, the control circuit 124 may be configured to calculate the duty cycles $d_1$, $d_2$ of the respective drive signals $V_{DR1}$, $V_{DR2}$ based on the target color temperature $T_{TRGT}$.

The control circuit 124 may then determine the on-times $T_{ON1}$, $T_{ON2}$ for the respective drive signals $V_{DR1}$, $V_{DR2}$ to achieve the target intensity level $L_{TRGT}$ and the target color temperature $T_{TRGT}$. For example, the control circuit 124 may calculate desired on-times $T_{ON1-D}$, $T_{ON2-D}$ for the respective drive signals $V_{DR1}$, $V_{DR2}$ based on the target intensity level $L_{TRGT}$ and the duty cycles $d_1$, $d_2$ as determined based on the target color temperature $T_{TRGT}$, e.g., $$T_{ON1-D} = d_1 \cdot L_{TRGT} \cdot T_{OP},$$

and $$T_{ON2-D} = d_2 \cdot L_{TRGT} \cdot T_{OP}.$$

The control circuit 124 may then determine each of the on-times $T_{ON1}$, $T_{ON2}$ for the respective drive signals $V_{DR1}$, $V_{DR2}$ by rounding each of the desired on-times $T_{ON1-D}$, $T_{ON2-D}$ to the closest multiple of the minimum step size $\Delta_{T-ON}$, e.g., $$T_{ON1} = \text{ROUND}(T_{ON1-D}) = \alpha \cdot \Delta_{T-ON},$$

and $$T_{ON2} = \text{ROUND}(T_{ON2-D}) = \beta \cdot \Delta_{T-ON},$$

wherein α and β are integer values. The control circuit 124 may then generate the drive signals $V_{DR1}$, $V_{DR2}$ using the respective on-times $T_{ON1}$, $T_{ON2}$ to control the cumulative light emitted by the light source 110 to the target intensity level $L_{TRGT}$ and the target color temperature $T_{TRGT}$.

While not shown in FIG. 1, the LED drive circuits 121, 122 may generate one or more feedback signals that may be received by the control circuit 124 and may indicate magnitudes of respective operating characteristics (e.g., LED currents and/or luminous flux) of the respective emitter circuits 111, 112 of the light source 110. In addition, the driver module 120 may comprise one or more feedback circuits (not shown), which may be external to the LED drive circuits 121, 122 and may generate the one or more feedback signals that are received by the control circuit 124. The control circuit 124 may adjust the average magnitude of each of the LED voltages $V_{LED1}$, $V_{LED2}$ towards respective target voltages in response to the feedback signals. In some examples, the control circuit 124 may adjust each of the average magnitude of each of the LED currents $I_{LED1}$, $I_{LED2}$ towards respective target currents in response to the feedback signals.

The control circuit 124 may be configured to adjust (e.g., dim) the present intensity level $L_{PRES}$ of the cumulative light emitted by the light source 110 towards a target intensity level $L_{TRGT}$ (e.g., a target brightness), which may range across a dimming range of the controllable lighting device, e.g., between the low-end intensity level $L_{LE}$ and the high-end intensity level $L_{HE}$. In some examples, the present intensity level $L_{PRES}$ of each emitter (e.g., LED) may be dependent upon the magnitude of the LED voltages $V_{LED1}$, $V_{LED2}$ developed across and/or the LED currents $I_{LED1}$, $I_{LED2}$ conducted through the emitter circuits 111, 112. The control circuit 120 may be configured to adjust the present color temperature $T_{PRES}$ of the cumulative light emitted by the light source 110 towards a target color temperature $T_{TRGT}$, which may range between a warm-white color temperature (e.g., approximately 1800 K) and/or a cool-white color temperature (e.g., approximately 3000 K). In some examples, the present color temperature $T_{PRES}$ of the cumulative light emitted by the light source 110 may be dependent upon (e.g., a function of) the magnitude of the LED voltages $V_{LED1}$, $V_{LED2}$ across and/or the LED currents $I_{LED1}$, $I_{LED2}$ through the emitter circuit (e.g., and/or the intensity level of the light emitted by the emitter circuit), and the color temperature of each emitter circuit.

The LED driver system 100 may comprise a communication circuit 126 coupled to the control circuit 120. The communication circuit 126 may comprise a wired communication circuit. Alternatively or additionally, the communication circuit 126 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. Alternatively or additionally, the communication circuit 126 may be coupled to the hot connection H and the neutral connection N of the LED driver system 100 for transmitting a control signal via the electrical wiring using, for example, a power-line carrier (PLC) communication technique. The control circuit 124 may be configured to receive and/or determine a commanded intensity level $L_{CMD}$ and/or a commanded color temperature $T_{CMD}$ from messages (e.g., digital messages) received via the communication circuit 126. The control circuit 124 may be configured to determine the target intensity level $L_{TRGT}$ or the target color temperature $T_{TRGT}$ for the light source 110 in response to the commanded intensity level $L_{CMD}$ and/or the commanded color temperature $T_{CMD}$ received via the messages. While not shown in FIG. 1, the driver module 120 may comprise a user interface having one or more actuators (e.g., buttons, sliders, etc.) for receiving user inputs, and the control circuit 124 may be configured to determine the target intensity level $L_{TRGT}$ or the target color temperature $T_{TRGT}$ for the light source 110 in response to actuation of the actuators of the user interface.

The LED driver system 100 may comprise a memory 128 configured to store operational characteristics (e.g., such as operational settings, control parameters, operating modes of the LED driver system 100, etc.), association information for associations with other devices, and/or instructions for controlling electrical loads. For example, the memory 128 may be configured to store the target intensity level $L_{TRGT}$, the target color temperature $T_{TRGT}$, the low-end intensity level $L_{LE}$, and/or the high-end intensity level $L_{HE}$. The memory 128 may be implemented as an external integrated circuit (IC) or as an internal circuit of the control circuit 124. The memory 128 may comprise a computer-readable storage media or machine-readable storage media that maintains computer-executable instructions for performing one or more procedure and/or functions as described herein. For example, the memory 128 may comprise computer-executable instructions or machine-readable instructions that when executed by the control circuit configure the control circuit to provide one or more portions of the procedures described herein. The control circuit 124 may access the instructions from the memory 128 for being executed to cause the control circuit 124 to operate as described herein, or to operate one or more other devices as described herein. The memory 128 may comprise computer-executable instructions for executing configuration software. For example, the operational characteristics and/or the association information stored in the memory 128 may be configured during a configuration procedure of the LED driver system 100.

The LED driver system 100 may comprise a power supply 129 that may receive the bus voltage $V_{BUS}$ and generate a supply voltage $V_{CC}$ for powering the control circuit 124 and other low-voltage circuitry of the LED driver system 100.

When the target intensity level $L_{TRGT}$ (e.g., as determined from the commanded intensity level $L_{CMD}$ as received via the communication circuit 126) is greater than (e.g., greater than or equal to) a threshold intensity level $L_{TH}$ (e.g., approximately 1%), the control circuit 124 may be configured to set the target intensity level $L_{TRGT}$ equal (e.g., approximately equal) to the commanded intensity level $L_{CMD}$, and set the target color temperature $T_{TRGT}$ equal (e.g., approximately equal) to the commanded color temperature $L_{TRGT}$. For example, the control circuit 124 may be configured to set the target intensity level $L_{TRGT}$ to the one of the number NL of intensity levels between the high-end intensity level $L_{HE}$ and the threshold intensity level $L_{TH}$ that is closest to the commanded intensity level $L_{CMD}$ (e.g., by rounding the commanded intensity level $L_{CMD}$ to the closest multiple of the intensity level step size $\Delta_L$). In some examples, the threshold intensity level $L_{TH}$ may be greater than or less than 1%.

Figure 2:
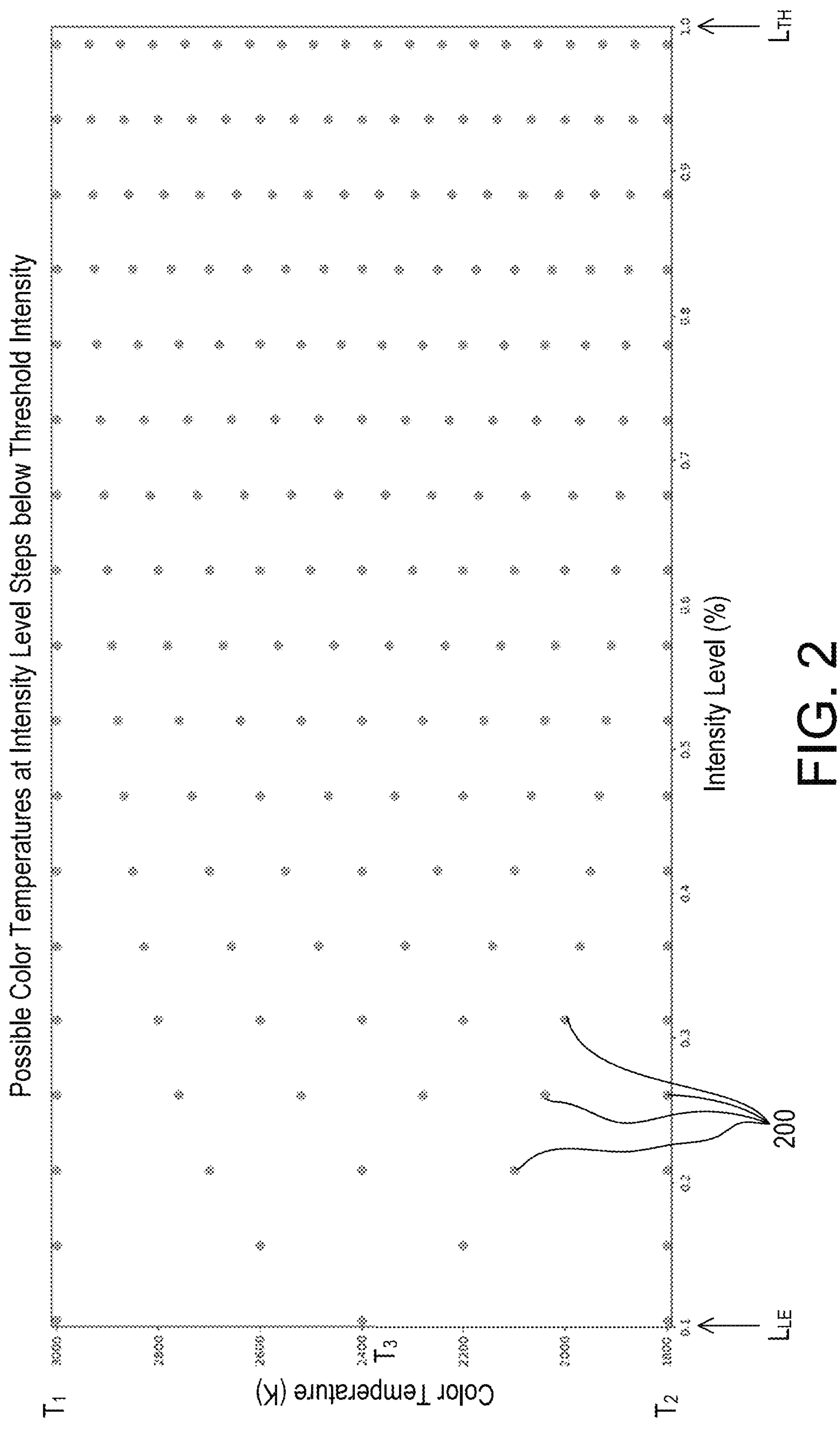
FIG. 2 illustrates possible operating points that define color temperatures that may be achieved by the light-emitting diode driver system of FIG. 1 at the discrete intensity levels below the threshold intensity level.

When the target intensity level $L_{TRGT}$ is near the low-end intensity level $L_{LE}$ (e.g., when the target intensity level $L_{TRGT}$ is less than the threshold intensity level $L_{TH}$), the control circuit 124 may not be able to control the present color temperature $T_{PRES}$ of the cumulative light emitted by the light source 110 to each of the color temperatures between the first color temperature $T_1$ and the second color temperature $T_2$ that are possible when the target intensity level $L_{TRGT}$ is greater than (e.g., greater than or equal to) the threshold intensity level $L_{TH}$ (e.g., due to the limitation of the minimum step size $\Delta_{T\text{-}ON}$ to which the control circuit 124 may adjust the on-time $T_{ON1}$ of the first drive signal $V_{DR1}$ and the on-time $T_{ON2}$ of the second drive signal $V_{DR2}$). FIG. 2 illustrates possible operating points 200 that define color temperatures that may be achieved at the discrete intensity levels below the threshold intensity level $L_{TH}$. As shown FIG. 2, the number of possible operating points 200 (e.g., color temperatures and corresponding intensity levels) that may be achieved at a specific intensity level decreases as the present intensity level $L_{PRES}$ nears the low-end intensity level $L_{LE}$ (e.g., approximately 0.1%). At the low-end intensity level $L_{LE}$, the control circuit 124 may be configured to control the present color temperature $T_{PRES}$ of the light emitted by the light source 110 to the first color temperature $T_1$ by turning on only the first emitter circuit 111 and to the second color temperature $T_2$ by turning on only the second emitter circuit 112. In addition, at the low-end intensity level $L_{LE}$, the control circuit 124 may be configured to control the present color temperature $T_{PRES}$ of the light emitted by the light source 110 to a third color temperature $T_3$ (e.g., a midpoint color temperature) between the first color temperature $T_1$ and the second temperature $T_2$. For example, the third color temperature $T_3$ may be approximately 2400 K. At the third color temperature $T_3$ at the low-end intensity level $L_{LE}$, the control circuit 124 may control both of the on-time $T_{ON1}$ of the first drive signal $V_{DR1}$ and the on-time $T_{ON2}$ of the second drive signal $V_{DR2}$ to the minimum on time $T_{ON\text{-}MIN}$. In other words, when commanded to go to the low-end intensity level $L_{LE}$, the control circuit 123 may be configured to control the cumulative light emitted by the light source 110 to only one of three color temperatures. In some examples, when commanded to go to the low-end intensity level $L_{LE}$, the control circuit 123 may be configured to control the cumulative light emitted by the light source 110 to only one of two color temperatures (e.g., the first color temperature $T_1$ and the second temperature $T_2$).

When the target intensity level $L_{TRGT}$ is less than the threshold intensity level $L_{TH}$, the control circuit 124 may be configured to set the target intensity level $L_{TRGT}$ equal (e.g., approximately equal) to the commanded intensity level $L_{CMD}$ (e.g., in the same manner as set when the target intensity level $L_{TRGT}$ is greater than the threshold intensity level $L_{TH}$). In addition, when the target intensity level $L_{TRGT}$ is less than the threshold intensity level $L_{TH}$, the control circuit 124 may be configured to converge the target color temperature $T_{TRGT}$ towards one or more of the possible color temperatures at the low-end intensity level $L_{LE}$ (e.g., such as the first, second, and third color temperatures $T_1$, $T_2$, $T_3$) as the target intensity level $L_{TRGT}$ decreases. For example, the control circuit 124 may be configured to limit the target color temperature $T_{TRGT}$ according to one or more limit curves when the target intensity level $L_{TRGT}$ is less than the threshold intensity level $L_{TH}$, which may allow the target color temperature $T_{TRGT}$ to converge towards the one or more of the possible color temperatures at the low-end intensity level $L_{LE}$ as the target intensity level $L_{TRGT}$ decreases. The one or more of the possible color temperatures at the low-end intensity level $L_{LE}$ to which the target color temperature $T_{TRGT}$ may converge may be dependent upon the commanded color temperature $T_{CMD}$. Converging the target color temperature $T_{TRGT}$ towards one or more color temperatures as the target intensity level $L_{TRGT}$ decreases towards the low-end intensity level $L_{LE}$ may cause the target color temperature $T_{TRGT}$ to change by amounts that are less visibly perceptible and providing smooth dimming near the low-end intensity level $L_{LE}$.

Figure 3:
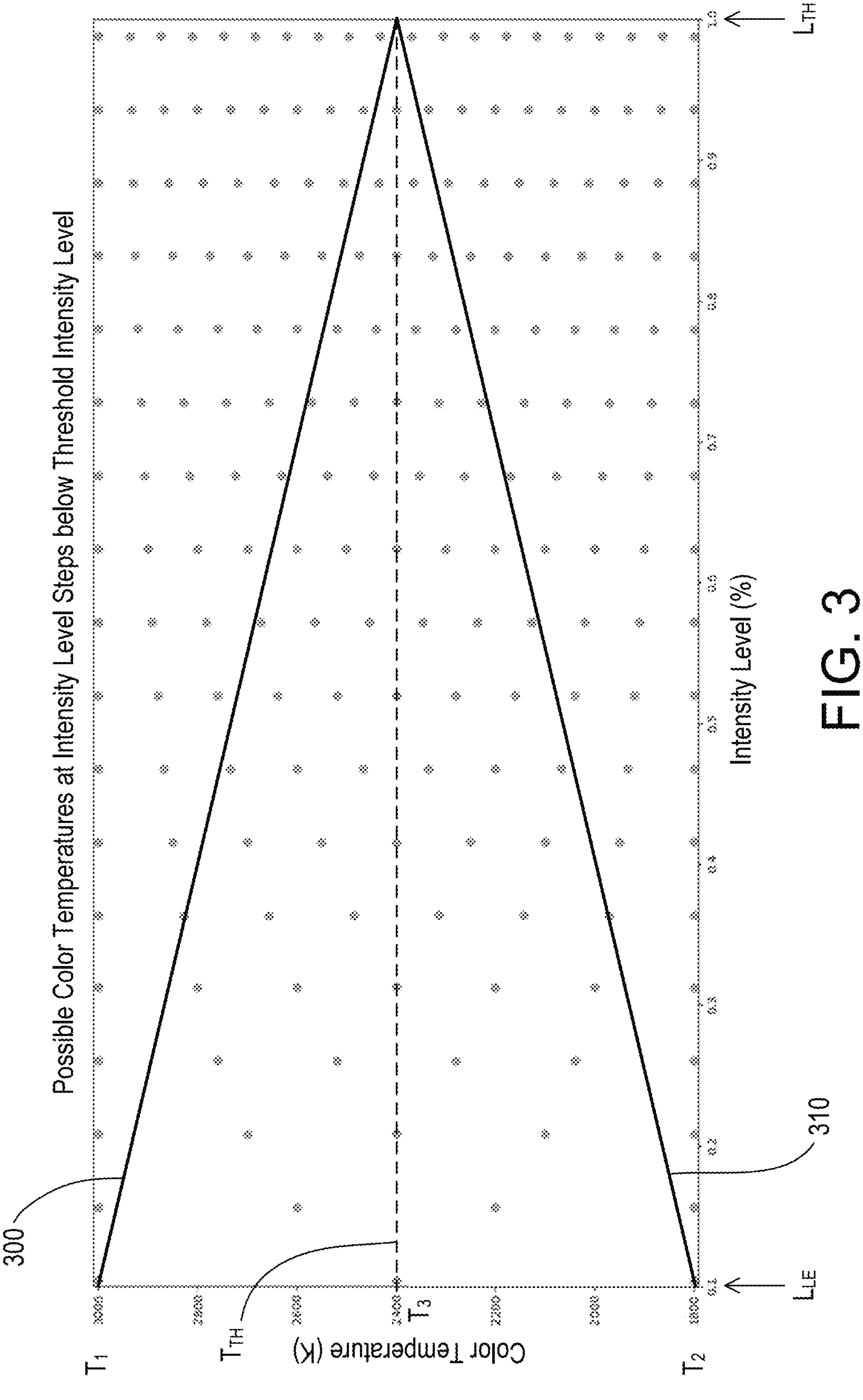
FIGS. 3-5 illustrates multiple examples of limit curves for defining adjustment of a target color temperature of a light source when a target intensity level for the light source is less than a threshold intensity level.

FIG. 3 illustrates multiple examples of limit curves 300, 310 for defining adjustment of a target color temperature $T_{TRGT}$ of a light source (e.g., the light source 110) when a target intensity level $L_{TRGT}$ for the light source is less than a threshold intensity level $L_{TH}$. For example, the target color temperature $T_{TRGT}$ of the light source may be adjusted by a control circuit of a driver module (e.g., such as the control circuit 124 of the driver module 120 of the LED driver system 100 shown in FIG. 1) according to the limit curves 300, 310 shown in FIG. 3 when the target intensity level $L_{TRGT}$ is less than the threshold intensity level $L_{TH}$. As shown in FIG. 3, the control circuit may be configured to converge the target color temperature $T_{TRGT}$ towards one of two color temperatures (e.g., the first color temperature $T_1$ and the second color temperature $T_2$) as the target intensity level $L_{TRGT}$ decreases towards the low-end intensity level $L_{LE}$. The one of the two color temperatures to which the target color temperature $T_{TRGT}$ may converge may depend upon the commanded color temperature $T_{CMD}$ (e.g., depend upon whether the commanded color temperature $T_{CMD}$ is greater than or less than a threshold color temperature $T_{TH}$). For example, the threshold color temperature $T_{TH}$ may be approximately equal to the third color temperature $T_3$ (e.g., approximately 2400 K).

When the commanded color temperature $T_{CMD}$ is greater than (e.g., greater than or equal to) the threshold color temperature $T_{TH}$, the control circuit may be configured to limit the target color temperature $T_{TRGT}$ of the light source according to the first limit curve 300. At a particular value of the target intensity level $L_{TRGT}$, the control circuit may not set the target color temperature $T_{TRGT}$ to be less than the first limit curve 300 when the commanded color temperature $T_{CMD}$ is greater than (e.g., greater than or equal to) the threshold color temperature $T_{TH}$. For example, the first limit curve 300 may define a linear relationship between the target color temperature $T_{TRGT}$ and the target intensity level $L_{TRGT}$ (e.g., a line) that extends from the third color temperature $T_3$ at the threshold intensity level $L_{TH}$ to the first color temperature $T_1$ at the low-end intensity level $L_{LE}$. In some examples, the first limit curve 300 may define a non-linear relationship (e.g., having a curved shaped and/or an exponential shape) between the target color temperature $T_{TRGT}$ and the target intensity level $L_{TRGT}$ that extends from the third color temperature $T_3$ at the threshold intensity level $L_{TH}$ to the first color temperature $T_1$ at the low-end intensity level $L_{LE}$. The first limit curve 300 may cause the target color temperature $T_{TRGT}$ of the light source to converge toward the first color temperature $T_1$ as the target intensity level $L_{TRGT}$ decreases towards the low-end intensity $L_{LE}$.

When the commanded color temperature $T_{CMD}$ is less than the threshold color temperature $T_{TH}$, the control circuit may be configured to limit the target color temperature $T_{TRGT}$ of the light source according to the second limit curve 310. At a particular value of the target intensity level $L_{TRGT}$, the control circuit may not set the target color temperature $T_{TRGT}$ to be greater than the second limit curve 310 when the commanded color temperature $T_{CMD}$ is less than the threshold color temperature $T_{TH}$. For example, the second limit curve 310 may define a linear relationship between the target color temperature $T_{TRGT}$ and the target intensity level $L_{TRGT}$ (e.g., a line) that extends from the third color temperature $T_3$ at the threshold intensity level $L_{TH}$ to the second color temperature $T_2$ at the low-end intensity level $L_{LE}$. In some examples, the second limit curve 310 may define a non-linear relationship (e.g., having a curved shaped and/or an exponential shape) between the target color temperature $T_{TRGT}$ and the target intensity level $L_{TRGT}$ that extends from the third color temperature $T_3$ at the threshold intensity level $L_{TH}$ to the second color temperature $T_2$ at the low-end intensity level $L_{LE}$. The second limit curve 310 may cause the target color temperature $T_{TRGT}$ of the light source to converge toward the second color temperature $T_2$ as the target intensity level $L_{TRGT}$ decreases towards the low-end intensity $L_{LE}$.

Figure 4:
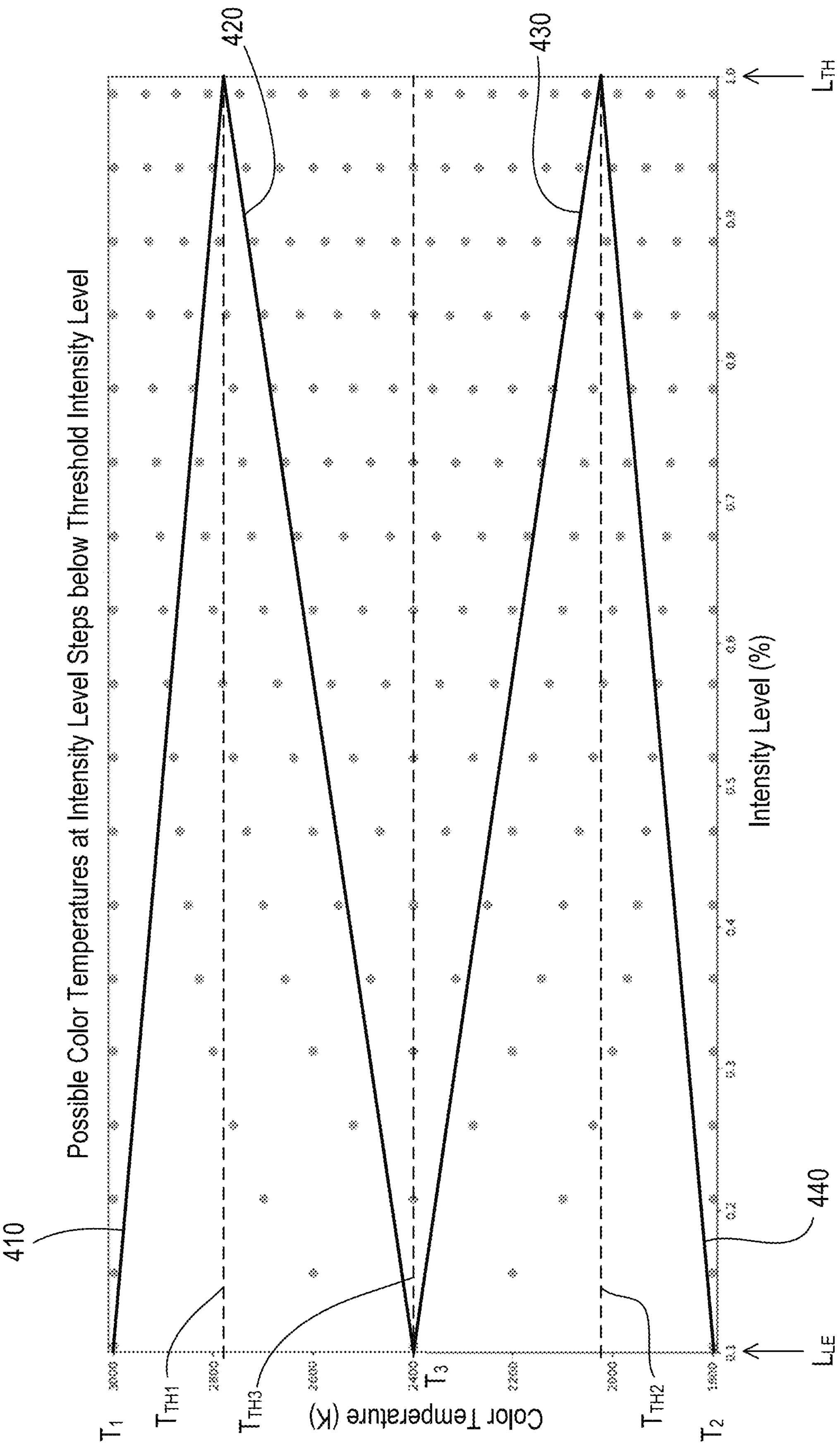

FIG. 4 illustrates multiple limit curves 410, 420, 430, 440 for defining adjustment of a target color temperature $T_{TRGT}$ of a light source (e.g., the light source 110) when a target intensity level $L_{TRGT}$ for the light source is less than a threshold intensity level $L_{TH}$. For example, the target color temperature $T_{TRGT}$ of the light source may be adjusted by a control circuit of a driver module (e.g., such as the control circuit 124 of the driver module 120 of the LED driver system 100 shown in FIG. 1) according to the limit curves 410, 420, 430, 440 shown in FIG. 4 when the target intensity level $L_{TRGT}$ is less than the threshold intensity level $L_{TH}$. As shown in FIG. 4, the control circuit may be configured to converge the target color temperature $T_{TRGT}$ towards one of three color temperatures (e.g., the first color temperature $T_1$, the second color temperature $T_2$, and the third color temperature $T_3$) as the target intensity level $L_{TRGT}$ decreases towards the low-end intensity level $L_{LE}$. The one of the three color temperatures to which the target color temperature $T_{TRGT}$ may converge may depend upon the commanded color temperature $T_{CMD}$ (e.g., depend upon whether the commanded color temperature $T_{CMD}$ is greater than or less than one of two threshold color temperatures $T_{TH1}$, $T_{TH2}$). For example, the first threshold color temperature $T_{TH1}$ may be approximately 2800 K and the second threshold color temperature $T_{TH2}$ may be approximately 2000 K.

When the commanded color temperature $T_{CMD}$ is greater than (e.g., greater than or equal to) the first threshold color temperature $T_{TH1}$, the control circuit may be configured to limit the target color temperature $T_{TRGT}$ of the light source according to the first limit curve 410. At a particular value of the target intensity level $L_{TRGT}$, the control circuit may not set the target color temperature $T_{TRGT}$ to be less than the first limit curve 410 when the commanded color temperature $T_{CMD}$ is greater than (e.g., greater than or equal to) the first threshold color temperature $T_{TH1}$. For example, the first limit curve 410 may define a linear relationship between the target color temperature $T_{TRGT}$ and the target intensity level $L_{TRGT}$ (e.g., a line) that extends from approximately 2800 k at the threshold intensity level $L_{TH}$ to the first color temperature $T_1$ at the low-end intensity level $L_{LE}$. In some examples, the first limit curve 410 may define a non-linear relationship (e.g., having a curved shaped and/or an exponential shape) between the target color temperature $T_{TRGT}$ and the target intensity level $L_{TRGT}$ that extends from approximately 2800 K at the threshold intensity level $L_{TH}$ to the first color temperature $T_1$ at the low-end intensity level $L_{LE}$. The first limit curve 410 may cause the target color temperature $T_{TRGT}$ of the light source to converge toward the first color temperature $T_1$ as the target intensity level $L_{TRGT}$ decreases towards the low-end intensity $L_{LE}$.

When the commanded color temperature $T_{CMD}$ is less than the second threshold color temperature $T_{TH2}$, the control circuit may be configured to limit the target color temperature $T_{TRGT}$ of the light source according to the fourth limit curve 440. At a particular value of the target intensity level $L_{TRGT}$, the control circuit may not set the target color temperature $T_{TRGT}$ to be greater than the fourth limit curve 440 when the commanded color temperature $T_{CMD}$ is less than second threshold color temperature $T_{TH2}$. For example, the fourth limit curve 440 may define a linear relationship between the target color temperature $T_{TRGT}$ and the target intensity level $L_{TRGT}$ (e.g., a line) that extends from approximately 2000 K at the threshold intensity level $L_{TH}$ to the second color temperature $T_2$ at the low-end intensity level $L_{LE}$. In some examples, the fourth limit curve 440 may define a non-linear relationship (e.g., having a curved shaped and/or an exponential shape) between the target color temperature $T_{TRGT}$ and the target intensity level $L_{TRGT}$ that extends from the approximately 2000 K at the threshold intensity level $L_{TH}$ to the second color temperature $T_2$ at the low-end intensity level $L_{LE}$. The fourth limit curve 440 may cause the target color temperature $T_{TRGT}$ of the light source to converge toward the second color temperature $T_2$ as the target intensity level $L_{TRGT}$ decreases towards the low-end intensity $L_{LE}$.

When the commanded color temperature $T_{CMD}$ is between the first threshold color temperature $T_{TH1}$ and the second threshold color temperature $T_{TH2}$, the control circuit may be configured to limit the target color temperature $T_{TRGT}$ of the light source according to the second limit curve 420 and the third limit curve 430. The second limit curve 420 and the third limit curve 430 may cause the target color temperature $T_{TRGT}$ of the light source to converge toward the third color temperature $T_3$ as the target intensity level $L_{TRGT}$ decreases towards the low-end intensity $L_{LE}$.

When the commanded color temperature $T_{CMD}$ is less than the first threshold color temperature $T_{TH1}$ and greater than (e.g., greater than or equal to) a third threshold color temperature $T_{TH3}$, the control circuit may be configured to limit the target color temperature $T_{TRGT}$ of the light source according to the second limit curve 420. For example, the third threshold color temperature $T_{TH3}$ may be approximately equal to the third color temperature $T_3$ (e.g., approximately 2400 K). At a particular value of the target intensity level $L_{TRGT}$, the control circuit may not set the target color temperature $T_{TRGT}$ to be greater than the second limit curve 420 when the commanded color temperature $T_{CMD}$ is less than first threshold color temperature $T_{TH1}$ and greater than (e.g., greater than or equal to) the third threshold color temperature $T_{TH3}$. For example, the second limit curve 420 may define a linear relationship between the target color temperature $T_{TRGT}$ and the target intensity level $L_{TRGT}$ (e.g., a line) that extends from approximately 2800 K at the threshold intensity level $L_{TH}$ to the third color temperature $T_3$ at the low-end intensity level $L_{LE}$. In some examples, the second limit curve 420 may define a non-linear relationship (e.g., having a curved shaped and/or an exponential shape) between the target color temperature $T_{TRGT}$ and the target intensity level $L_{TRGT}$ that extends from the approximately 2800 K at the threshold intensity level $L_{TH}$ to the third color temperature $T_3$ at the low-end intensity level $L_{LE}$.

When the commanded color temperature $T_{CMD}$ is less than the third threshold color temperature $T_{TH3}$ and greater than (e.g., greater than or equal to) the second threshold color temperature $T_{TH2}$, the control circuit may be configured to limit the target color temperature $T_{TRGT}$ of the light source according to the third limit curve 430. At a particular value of the target intensity level $L_{TRGT}$, the control circuit may not set the target color temperature $T_{TRGT}$ to be less than the third limit curve 430 when the commanded color temperature $T_{CMD}$ is less than the third threshold color temperature $T_{TH3}$ and greater than (e.g., greater than or equal to) the second threshold color temperature $T_{TH2}$. For example, the third limit curve 430 may define a linear relationship between the target color temperature $T_{TRGT}$ and the target intensity level $L_{TRGT}$ (e.g., a line) that extends from approximately 2000 K at the threshold intensity level $L_{TH}$ to the third color temperature $T_3$ at the low-end intensity level $L_{LE}$. In some examples, the third limit curve 430 may define a non-linear relationship (e.g., having a curved shaped and/or an exponential shape) between the target color temperature $T_{TRGT}$ and the target intensity level $L_{TRGT}$ that extends from approximately 2000 K at the threshold intensity level $L_{TH}$ to the third color temperature $T_3$ at the low-end intensity level $L_{LE}$.

Figure 5:
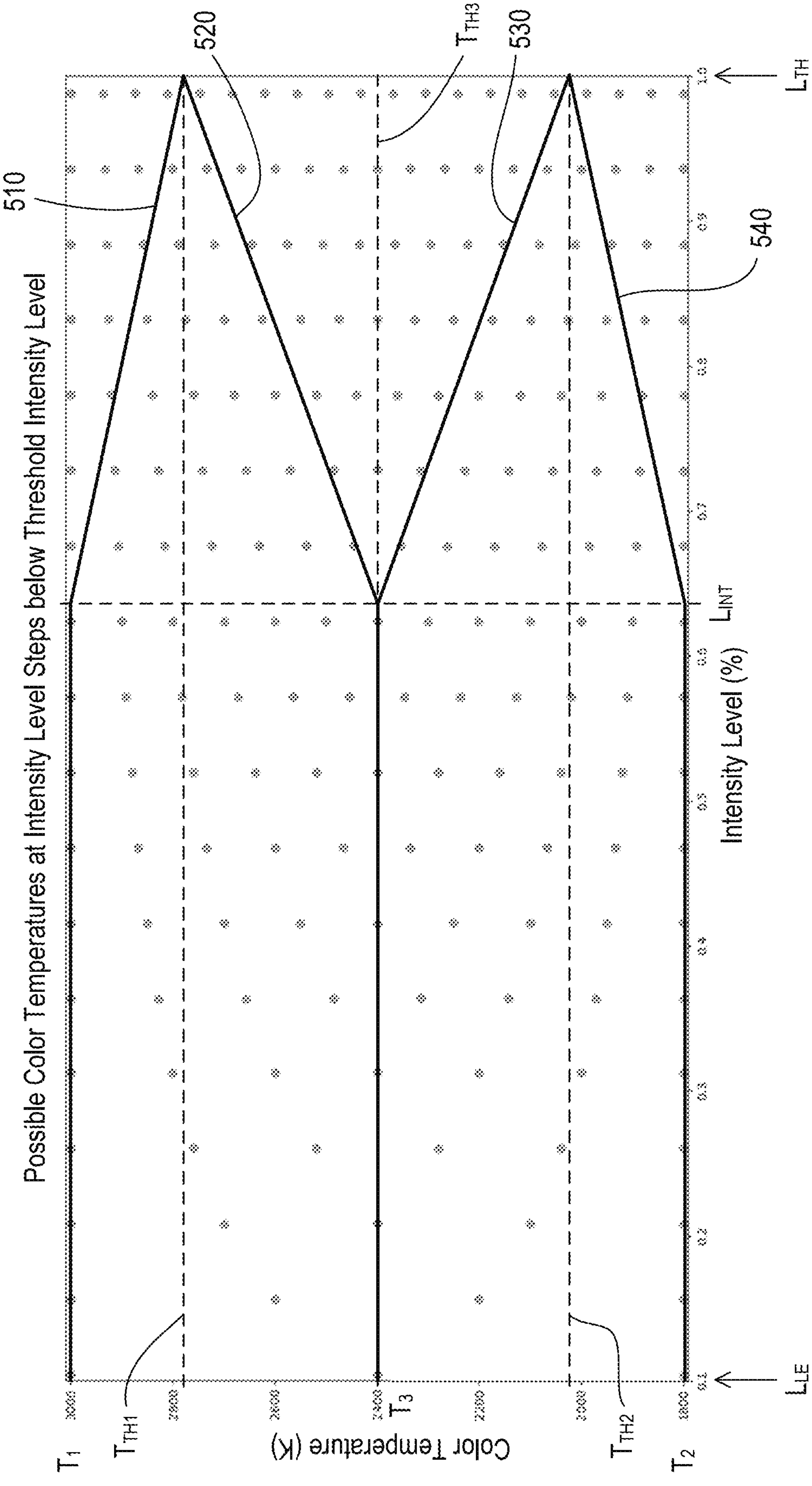

FIG. 5 illustrates multiple limit curves 510, 520, 530, 540 for defining adjustment of a target color temperature $T_{TRGT}$ of a light source (e.g., the light source 110) when a target intensity level $L_{TRGT}$ for the light source is less than a threshold intensity level $L_{TH}$. For example, the target color temperature $T_{TRGT}$ of the light source may be adjusted by a control circuit of a driver module (e.g., such as the control circuit 124 of the driver module 120 of the LED driver system 100 shown in FIG. 1) according to the limit curves 510, 520, 530, 540 shown in FIG. 5 when the target intensity level $L_{TRGT}$ is less than the threshold intensity level $L_{TH}$. As shown in FIG. 5, the control circuit may be configured to converge the target color temperature $T_{TRGT}$ towards one of three color temperatures (e.g., the first color temperature $T_1$, the second color temperature $T_2$, and the third color temperature $T_3$) as the target intensity level $L_{TRGT}$ decreases towards the low-end intensity level $L_{LE}$. The one of the three color temperatures to which the target color temperature $T_{TRGT}$ may converge may depend upon the commanded color temperature $T_{CMD}$ (e.g., depend upon whether the commanded color temperature $T_{CMD}$ is greater than or less than one of two threshold color temperatures $T_{TH1}$, $T_{TH2}$). For example, the first threshold color temperature $T_{TH1}$ may be approximately 2800 K and the second threshold color temperature $T_{TH2}$ may be approximately 2000 K.

According to the limit curves 510, 520, 530, 540 shown in FIG. 5, the control circuit may be configured to converge the target color temperature $T_{TRGT}$ towards one of three color temperatures across a smaller range of the target intensity level $L_{TRGT}$ as the target intensity level $L_{TRGT}$ decreases towards the low-end intensity level $L_{LE}$ (e.g., as compared to when the control circuit uses the limit curves 410, 420, 430, 440 shown in FIG. 4). Each of the limit curves 510, 520, 530, 540 may define a linear region between the threshold intensity level $L_{TH}$ and an intermediate intensity level $L_{INT}$ where the target color temperature $T_{TRGT}$ is variable with respect to the target intensity level $L_{TRGT}$. When the target intensity level $L_{TRGT}$ is less than the intermediate intensity level $L_{INT}$, the target color temperature $T_{TRGT}$ may be held constant at one of the three color temperatures (e.g., the first color temperature $T_1$, the second color temperature $T_2$, or the third color temperature $T_3$).

When the commanded color temperature $T_{CMD}$ is greater than (e.g., greater than or equal to) the first threshold color temperature $T_{TH1}$, the control circuit may be configured to limit the target color temperature $T_{TRGT}$ of the light source according to the first limit curve 510. At a particular value of the target intensity level $L_{TRGT}$, the control circuit may not set the target color temperature $T_{TRGT}$ to be less than the first limit curve 510 when the commanded color temperature $T_{CMD}$ is greater than (e.g., greater than or equal to) the first threshold color temperature $T_{TH1}$. For example, the first limit curve 510 may define a linear relationship between the target color temperature $T_{TRGT}$ and the target intensity level $L_{TRGT}$ (e.g., a line) that extends from approximately 2800 k at the threshold intensity level $L_{TH}$ to the first color temperature $T_1$ at the intermediate intensity level $L_{INT}$. In some examples, the first limit curve 510 may define a non-linear relationship (e.g., having a curved shaped and/or an exponential shape) between the target color temperature $T_{TRGT}$ and the target intensity level $L_{TRGT}$ that extends from approximately 2800 K at the threshold intensity level $L_{TH}$ to the first color temperature $T_1$ at the intermediate intensity level $L_{INT}$. The first limit curve 510 may cause the target color temperature $T_{TRGT}$ of the light source to converge toward the first color temperature $T_1$ as the target intensity level $L_{TRGT}$ decreases towards the intermediate intensity level $L_{INT}$. Below the intermediate intensity level $L_{INT}$, the first limit curve 510 may be equal to the first color temperature $T_1$.

When the commanded color temperature $T_{CMD}$ is less than the second threshold color temperature $T_{TH2}$, the control circuit may be configured to limit the target color temperature $T_{TRGT}$ of the light source according to the fourth limit curve 540. At a particular value of the target intensity level $L_{TRGT}$, the control circuit may not set the target color temperature $T_{TRGT}$ to be greater than the fourth limit curve 540 when the commanded color temperature $T_{CMD}$ is less than second threshold color temperature $T_{TH2}$. For example, the fourth limit curve 540 may define a linear relationship between the target color temperature $T_{TRGT}$ and the target intensity level $L_{TRGT}$ (e.g., a line) that extends from approximately 2000 K at the threshold intensity level $L_{TH}$ to the second color temperature $T_2$ at the intermediate intensity level $L_{INT}$. In some examples, the fourth limit curve 540 may define a non-linear relationship (e.g., having a curved shaped and/or an exponential shape) between the target color temperature $T_{TRGT}$ and the target intensity level $L_{TRGT}$ that extends from the approximately 2000 K at the threshold intensity level $L_{TH}$ to the second color temperature $T_2$ at the intermediate intensity level $L_{INT}$. The fourth limit curve 540 may cause the target color temperature $T_{TRGT}$ of the light source to converge toward the second color temperature $T_2$ as the target intensity level $L_{TRGT}$ decreases towards the intermediate intensity level $L_{INT}$. Below the intermediate intensity level $L_{INT}$, the fourth limit curve 540 may be equal to the second color temperature $T_2$.

When the commanded color temperature $T_{CMD}$ is between the first threshold color temperature $T_{TH1}$ and the second threshold color temperature $T_{TH2}$, the control circuit may be configured to limit the target color temperature $T_{TRGT}$ of the light source according to the second limit curve 520 and the third limit curve 530. The second limit curve 520 and the third limit curve 530 may cause the target color temperature $T_{TRGT}$ of the light source to converge toward the third color temperature $T_3$ as the target intensity level $L_{TRGT}$ decreases towards the intermediate intensity level $L_{INT}$.

When the commanded color temperature $T_{CMD}$ is less than the first threshold color temperature $T_{TH1}$ and greater than (e.g., greater than or equal to) a third threshold color temperature $T_{TH3}$, the control circuit may be configured to limit the target color temperature $T_{TRGT}$ of the light source according to the second limit curve 520. For example, the third threshold color temperature $T_{TH3}$ may be approximately equal to the third color temperature $T_3$ (e.g., approximately 2400 K). At a particular value of the target intensity level $L_{TRGT}$, the control circuit may not set the target color temperature $T_{TRGT}$ to be greater than the second limit curve 520 when the commanded color temperature $T_{CMD}$ is less than first threshold color temperature $T_{TH1}$ and greater than (e.g., greater than or equal to) the third threshold color temperature $T_{TH3}$. For example, the second limit curve 420 may define a linear relationship between the target color temperature $T_{TRGT}$ and the target intensity level $L_{TRGT}$ (e.g., a line) that extends from approximately 2800 K at the threshold intensity level $L_{TH}$ to the third color temperature $T_3$ at the intermediate intensity level $L_{INT}$. In some examples, the second limit curve 520 may define a non-linear relationship (e.g., having a curved shaped and/or an exponential shape) between the target color temperature $T_{TRGT}$ and the target intensity level $L_{TRGT}$ that extends from the approximately 2800 K at the threshold intensity level $L_{TH}$ to the third color temperature $T_3$ at the intermediate intensity level $L_{INT}$. Below the intermediate intensity level $L_{INT}$, the second limit curve 520 may be equal to the third color temperature $T_3$.

When the commanded color temperature $T_{CMD}$ is less than the third threshold color temperature $T_{TH3}$ and greater than (e.g., greater than or equal to) the second threshold color temperature $T_{TH2}$, the control circuit may be configured to limit the target color temperature $T_{TRGT}$ of the light source according to the third limit curve 530. At a particular value of the target intensity level $L_{TRGT}$, the control circuit may not set the target color temperature $T_{TRGT}$ to be less than the third limit curve 530 when the commanded color temperature $T_{CMD}$ is less than the third threshold color temperature $T_{TH3}$ and greater than (e.g., greater than or equal to) the second threshold color temperature $T_{TH2}$. For example, the third limit curve 530 may define a linear relationship between the target color temperature $T_{TRGT}$ and the target intensity level $L_{TRGT}$ (e.g., a line) that extends from approximately 2000 K at the threshold intensity level $L_{TH}$ to the third color temperature $T_3$ at the intermediate intensity level $L_{INT}$. In some examples, the third limit curve 420 may define a non-linear relationship (e.g., having a curved shaped and/or an exponential shape) between the target color temperature $T_{TRGT}$ and the target intensity level $L_{TRGT}$ that extends from approximately 2000 K at the threshold intensity level $L_{TH}$ to the third color temperature $T_3$ at the intermediate intensity level $L_{INT}$. Below the intermediate intensity level $L_{INT}$, the third limit curve 530 may be equal to the third color temperature $T_3$.

Figure 6:
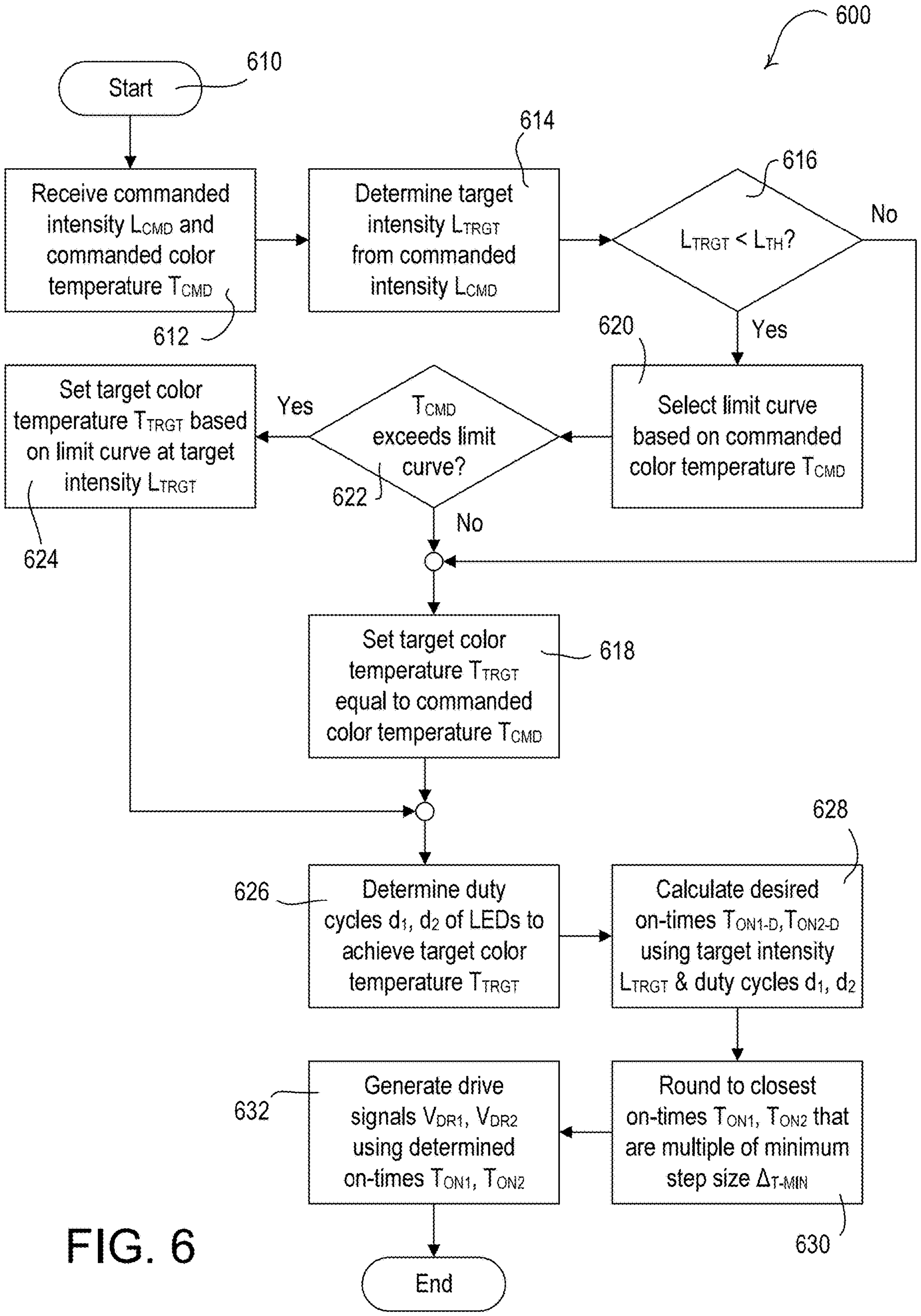
FIG. 6 is a flowchart of an example procedure for adjusting a target color temperature of a light source.

FIG. 6 is a flowchart of an example procedure 600 for adjusting a target color temperature $T_{TRGT}$ of a light source (e.g., the light source 110). The procedure 600 may be executed by a control circuit of a driver module (e.g., such as the control circuit 124 of the driver module 120 of the LED driver system 100 shown in FIG. 1). The light source may comprise a first emitter circuit (e.g., a first LED circuit) configured to emit light at a first color temperature $T_1$ and a second emitter circuit (e.g., a second LED circuit) configured to emit light at a second color temperature $T_2$. The control circuit may be configured to generate a first drive signal $V_{DR1}$ to control a first LED drive circuit for controlling an intensity level of the first emitter circuit and generate a second drive signal $V_{DR2}$ to control a second LED drive circuit for controlling an intensity level of the second emitter circuit. The control circuit may adjust the intensity levels of the first and second emitter circuits of the light source to control a present intensity level $L_{PRES}$ and a present color temperature $T_{PRES}$ of a cumulative light emitted by the light source. For example, the control circuit may execute the procedure 600 periodically at 610. In addition, the control circuit may execute the procedure 600 at 610 in response to receiving a message via a communication circuit (e.g., the communication circuit 126) and/or in response to an actuation of an actuator of the driver module.

At 612, the control circuit may receive a commanded intensity level $L_{CMD}$ and/or a commanded color temperature $T_{CMD}$. For example, the control circuit may receive the commanded intensity level $L_{CMD}$ and/or the commanded color temperature $T_{CMD}$ in a message received via the communication circuit. At 614, the control circuit may determine a target intensity level $L_{TRGT}$ in response to the commanded intensity level $L_{CMD}$. For example, the control circuit may be configured to control the first and second LED drive circuits to control the present intensity level $L_{PRES}$ of the cumulative light emitted by the light source towards the target intensity level $L_{TRGT}$. The control circuit may be configured to set the target intensity level $L_{TRGT}$ to the one of a number NL of intensity levels between a high-end intensity level $L_{HE}$ and a low-end intensity level $L_{LE}$ that is closest to the commanded intensity level $L_{CMD}$ (e.g., by rounding the commanded intensity level $L_{CMD}$ to the closest multiple of an intensity level step size $\Delta_L$).

At 616, the control circuit may determine if the target intensity level $L_{TRGT}$ is less than a threshold intensity level $L_{TH}$ (e.g., is near the low-end intensity level $L_{LE}$). When the target intensity level $L_{TRGT}$ is greater than (e.g., greater than or equal to) the threshold intensity level $L_{TH}$ at 616, the control circuit may set the target color temperature $T_{TRGT}$ equal to (e.g., approximately equal to) the commanded color temperature $T_{CMD}$ at 618. When the target intensity level $L_{TRGT}$ is less than the threshold intensity level $L_{TH}$ at 616, the control circuit may select one or more limit curves based on the commanded color temperature $L_{CMD}$ at 620. The control circuit may select, for example, one of the two limit curves 300, 310 shown in FIG. 3. For example, the control circuit may select one of the first limit curve 300 when the commanded color temperature $L_{CMD}$ is greater than a threshold color temperature $T_{TH}$, and the second limit curve 310 when the commanded color temperature is less than the threshold color temperature $T_{TH}$. In addition, the control circuit may select, for example, one of the four limit curves 410, 420, 430, 440 shown in FIG. 4 and/or one of the four limit curves 510, 520, 530, 540 shown in FIG. 5.

At 622, the control circuit may determine if the commanded color temperature $T_{CMD}$ exceeds one of the limit curves selected at 620. For example, the control circuit may determine that the commanded color temperature $T_{CMD}$ exceeds one of the limit curves when the commanded color temperature is to the left of the select limit curves as shown in FIGS. 3-5. When the commanded color temperature $L_{CMD}$ is greater than the threshold color temperature $T_{TH}$, the control circuit may determine, for example, that the commanded color temperature $T_{CMD}$ exceeds the first limit curve 300 (e.g., as shown in FIG. 3) when the commanded color temperature $L_{CMD}$ is less than the first limit curve 300 at the target intensity level $L_{TRGT}$. When the commanded color temperature $L_{CMD}$ is less than the threshold color temperature $T_{TH}$, the control circuit may determine, for example, that the commanded color temperature $T_{CMD}$ exceeds the second limit curve 310 (e.g., as shown in FIG. 3) when the commanded color temperature $L_{CMD}$ is greater than the second limit curve 310 at the target intensity level $L_{TRGT}$. The control circuit may similarly determine that the commanded color temperature $T_{CMD}$ has exceeded the limit curves 410-440 (e.g., as shown in FIG. 4) and the limit curves 510-540 (e.g., as shown in FIG. 5).

When the control circuit determines that the commanded color temperature $T_{CMD}$ does exceeds the selected limit curve at 622, the control circuit may set the target color temperature $T_{TRGT}$ equal to (e.g., approximately equal to) the commanded color temperature $T_{CMD}$ at 618. When the control circuit determines that the commanded color temperature $T_{CMD}$ exceeds the limit curve selected at 622, the control circuit may limit the target color temperature $T_{TRGT}$ based on the limit curves at 624. For example, the control circuit may set the target color temperature $T_{TRGT}$ equal to a value of a limited color temperature on the selected limit curve at the target intensity level $L_{TRGT}$ (e.g., as determined at 614). When the commanded color temperature $L_{CMD}$ is greater than the threshold color temperature $T_{TH}$, the control circuit may set the target color temperature $T_{TRGT}$ equal to, for example, the value of the limited color temperature on the first limit curve 300 at the target intensity level $L_{TRGT}$. When the commanded color temperature $L_{CMD}$ is less than the threshold color temperature $T_{TH}$, the control circuit may set the target color temperature $T_{TRGT}$ equal to, for example, the value of the limited color temperature on the second limit curve 310 at the target intensity level $L_{TRGT}$. The control circuit may similarly set the target color temperature $T_{TRGT}$ equal to values of limited color temperatures on the limit curves 410-440 (e.g., as shown in FIG. 4) and the limit curves 510-540 (e.g., as shown in FIG. 5).

After the target color temperature $T_{TRGT}$ is set at 618 or 624, the control circuit may determine duty cycles $d_1$, $d_2$ of the respective drive signals $V_{DR1}$, $V_{DR2}$ for controlling the present color temperature $T_{PRES}$ of the light emitted by the light source to the target color temperature $T_{TRGT}$ at 626. For example, the control circuit 124 may be configured to calculate the duty cycles $d_1$, $d_2$ of the respective drive signals $V_{DR1}$, $V_{DR2}$ based on the target color temperature $T_{TRGT}$. At 628, the control circuit may calculate desired on-times $T_{ON1\text{-}D}$, $T_{ON2\text{-}D}$ for the respective drive signals $V_{DR1}$, $V_{DR2}$ based on the target intensity level $L_{TRGT}$ and the duty cycles $d_1$, $d_2$ as determined based on the target color temperature $T_{TRGT}$ (e.g., $T_{ON1\text{-}D}=d_1 \cdot L_{TRGT} \cdot T_{OP}$, and $T_{ON2\text{-}D}=d_2 \cdot L_{TRGT} \cdot T_{OP}$). At 630, the control circuit may determine on-times $T_{ON1}$, $T_{ON2}$ for the respective drive signals $V_{DR1}$, $V_{DR2}$ by rounding each of the desired on-times $T_{ON1}$-D, $T_{ON2\text{-}D}$ to the closest multiple of a minimum step size $\Delta_{T\text{-}ON}$. Rounding to the closest multiple of the minimum step size $\Delta_{T\text{-}ON}$ may cause the control circuit to control the present color temperature $T_{PRES}$ to the closest operating point (e.g., one of the operating points 200 shown in FIG. 2) to the target color temperature $T_{TRGT}$ at the target intensity level $L_{TRGT}$. At 632, the control circuit may generate the drive signals $V_{DR1}$, $V_{DR2}$ using the respective on-times $T_{ON1}$, $T_{ON2}$ to control the cumulative light emitted by the light source to the target intensity level $L_{TRGT}$ and the target color temperature $T_{TRGT}$.

What is claimed is:

1. A load control device for controlling an amount of power delivered to a light source having a first emitter circuit configured to emit light having a first color temperature and a second emitter circuit configured to emit light having a second color temperature, the load control device comprising:

a first drive circuit configured to control a first intensity level of the first emitter circuit;

a second drive circuit configured to control a second intensity level of the second emitter circuit; and a control circuit configured to control the first drive circuit and the second drive circuit to adjust the first intensity level of the first emitter circuit and the second intensity level of the second emitter circuit to cause a present intensity level and a present color temperature of a cumulative light emitted by the light source to be controlled towards a target intensity level and a target color temperature, respectively;

wherein, when the target intensity level is less than a threshold intensity level, the control circuit is configured to limit the target color temperature according to at least one limit curve that causes the target color temperature to converge towards at least one of a first color temperature or a second color temperature as the target intensity level decreases towards a low-end intensity level.

2. The load control device of claim 1, wherein the control circuit is configured to:

receive a commanded color temperature for controlling a cumulative light emitted by the light source;

when the commanded color temperature is greater than a threshold color temperature, limit the target color temperature according to a first limit curve that causes the target color temperature to converge towards the first color temperature as the target intensity level decreases towards the low-end intensity level; and when the commanded color temperature is less than the threshold color temperature, limit the target color temperature according to a second limit curve that causes the target color temperature to converge towards the second color temperature as the target intensity level decreases towards the low-end intensity level.

3. The load control device of claim 2, wherein the control circuit is configured to:

cause the target color temperature to converge towards the first color temperature as the target intensity level decreases towards the low-end intensity level by setting the target color temperature equal to a value of a first limited color temperature on the first limit curve at the target intensity level when the commanded color temperature exceeds the first limit curve; and cause the target color temperature to converge towards the second color temperature as the target intensity level decreases towards the low-end intensity level by setting the target color temperature equal to a value of a second limited color temperature on the second limit curve at the target intensity level when the commanded color temperature exceeds the second limit curve.

4. The load control device of claim 3, wherein the control circuit is configured to:

set the target color temperature equal to the commanded color temperature when the commanded color temperature is greater than the threshold color temperature and the commanded color temperature does not exceed the first limit curve; and set the target color temperature equal to the commanded color temperature when the commanded color temperature is less than the threshold color temperature and the commanded color temperature does not exceed the second limit curve.

5. The load control device of claim 3, wherein the control circuit is configured to:

determine that the commanded color temperature exceeds the first limit curve when the commanded color temperature is greater than the threshold color temperature and the commanded color temperature is less than the first limit curve at the target intensity level; and determine that the commanded color temperature exceeds the second limit curve when the commanded color temperature is less than the threshold color temperature and the commanded color temperature is less than the second limit curve at the target intensity level.

6. The load control device of claim 2, further comprising:

a communication circuit configured to receive messages;

wherein the control circuit is configured to receive a message including the commanded color temperature.

7. The load control device of claim 1, wherein the control circuit is configured to:

receive a commanded color temperature for controlling a cumulative light emitted by the light source;

when the commanded color temperature is greater than a first threshold color temperature, limit the target color temperature according to a first limit curve that causes the target color temperature to converge towards the first color temperature as the target intensity level decreases towards the low-end intensity level;

when the commanded color temperature is less than a second threshold color temperature, limit the target color temperature according to a second limit curve that causes the target color temperature to converge towards the second color temperature as the target intensity level decreases towards the low-end intensity level; and when the commanded color temperature is between the first and second threshold color temperatures, limit the target color temperature according to a third and fourth limit curves that cause the target color temperature to converge towards a third color temperature as the target intensity level decreases towards the low-end intensity level, wherein the third color temperature is between the first and second color temperatures.

8. The load control device of claim 7, wherein the control circuit is configured to:

cause the target color temperature to converge towards the first color temperature as the target intensity level decreases towards the low-end intensity level by setting the target color temperature equal to the value of the first limited color temperature on the first limit curve at the target intensity level when the commanded color temperature exceeds the first limit curve;

cause the target color temperature to converge towards the second color temperature as the target intensity level decreases towards the low-end intensity level by setting the target color temperature equal to the value of the second limited color temperature on the second limit curve at the target intensity level when the commanded color temperature exceeds the second limit curve; and cause the target color temperature to converge towards the third color temperature as the target intensity level decreases towards the low-end intensity level by setting the target color temperature equal to a value of a third limited color temperature on the third limit curve at the target intensity level when the commanded color temperature is greater than the third color temperature and the commanded color temperature exceeds the third limit curve, and setting the target color temperature equal to a value of a fourth limited color temperature on the fourth limit curve at the target intensity level when the commanded color temperature is less than the third color temperature and the commanded color temperature exceeds the fourth limit curve.

9. The load control device of claim 7, wherein the control circuit is configured to cause the target color temperature to converge to the first, second, and third color temperatures when the target intensity level is equal to an intermediate intensity level that is less than the threshold intensity level and greater than the low-end intensity level.

10. The load control device of claim 1, wherein control circuit configured to:

generate first and second drive signals for controlling the first and second drive circuits, respectively;

determine respective on-times for the first and second drive signals in response to the target intensity level and the target color temperature; and round the respective on-times for the first and second drive signals to multiples of a minimum step size at which the control circuit may adjust the respective on-times of the first and second drive signals.

11. A method for controlling an amount of power delivered to a light source having a first emitter circuit configured to emit light having a first color temperature and a second emitter circuit configured to emit light having a second color temperature, the method comprising:

controlling a first drive circuit to control a first intensity level of the first emitter circuit;

controlling a second drive circuit to control a second intensity level of the second emitter circuit;

controlling the first and second drive circuits to cause a present intensity level and a present color temperature of a cumulative light emitted by the light source to be controlled towards a target intensity level and a target color temperature, respectively; and when the target intensity level is less than a threshold intensity level, limiting the target color temperature according to at least one limit curve that causes the target color temperature to converge towards at least one of a first color temperature or a second color temperature as the target intensity level decreases towards a low-end intensity level.

12. The method of claim 11, further comprising:

receiving a commanded color temperature for controlling a cumulative light emitted by the light source.

13. The method of claim 12, wherein limiting the target color temperature further comprises:

when the commanded color temperature is greater than a threshold color temperature, limiting the target color temperature according to a first limit curve that causes the target color temperature to converge towards the first color temperature as the target intensity level decreases towards the low-end intensity level; and when the commanded color temperature is less than the threshold color temperature, limiting the target color temperature according to a second limit curve that causes the target color temperature to converge towards the second color temperature as the target intensity level decreases towards the low-end intensity level.

14. The method of claim 13, wherein limiting the target color temperature according to the first limit curve further comprises setting the target color temperature equal to a value of a first limited color temperature on the first limit curve at the target intensity level when the commanded color temperature exceeds the first limit curve; and wherein limiting the target color temperature according to the second limit curve further comprises setting the target color temperature equal to a value of a second limited color temperature on the second limit curve at the target intensity level when the commanded color temperature exceeds the second limit curve.

15. The method of claim 14, further comprising:

setting the target color temperature equal to the commanded color temperature when the commanded color temperature is greater than the threshold color temperature and the commanded color temperature does not exceed the first limit curve; and setting the target color temperature equal to the commanded color temperature when the commanded color temperature is less than the threshold color temperature and the commanded color temperature does not exceed the second limit curve.

16. The method of claim 14, further comprising:

determining that the commanded color temperature exceeds the first limit curve when the commanded color temperature is greater than the threshold color temperature and the commanded color temperature is less than the first limit curve at the target intensity level; and determining that the commanded color temperature exceeds the second limit curve when the commanded color temperature is less than the threshold color temperature and the commanded color temperature is less than the second limit curve at the target intensity level.

17. The method of claim 12, wherein limiting the target color temperature further comprises:

when the commanded color temperature is greater than a first threshold color temperature, limiting the target color temperature according to a first limit curve that causes the target color temperature to converge towards the first color temperature as the target intensity level decreases towards the low-end intensity level;

when the commanded color temperature is less than a second threshold color temperature, limiting the target color temperature according to a second limit curve that causes the target color temperature to converge towards the second color temperature as the target intensity level decreases towards the low-end intensity level; and when the commanded color temperature is between the first and second threshold color temperatures, limiting the target color temperature according to a third and fourth limit curves that cause the target color temperature to converge towards a third color temperature as the target intensity level decreases towards the low-end intensity level, wherein the third color temperature is between the first and second color temperatures.

18. The method of claim 17, further comprising:

causing the target color temperature to converge to the first, second, and third color temperatures when the target intensity level is equal to an intermediate intensity level that is less than the threshold intensity level and greater than the low-end intensity level.

19. The method of claim 12, further comprising:

receiving a message including the commanded color temperature.

20. The method of claim 11, further comprising:

generating first and second drive signals for controlling the first and second drive circuits, respectively;

determining respective on-times for the first and second drive signals in response to the target intensity level and the target color temperature; and rounding the respective on-times for the first and second drive signals to multiples of a minimum step size at which the control circuit may adjust the respective on-times of the first and second drive signals.

* * * * *